UNITED STATES PATENT OFFICE.

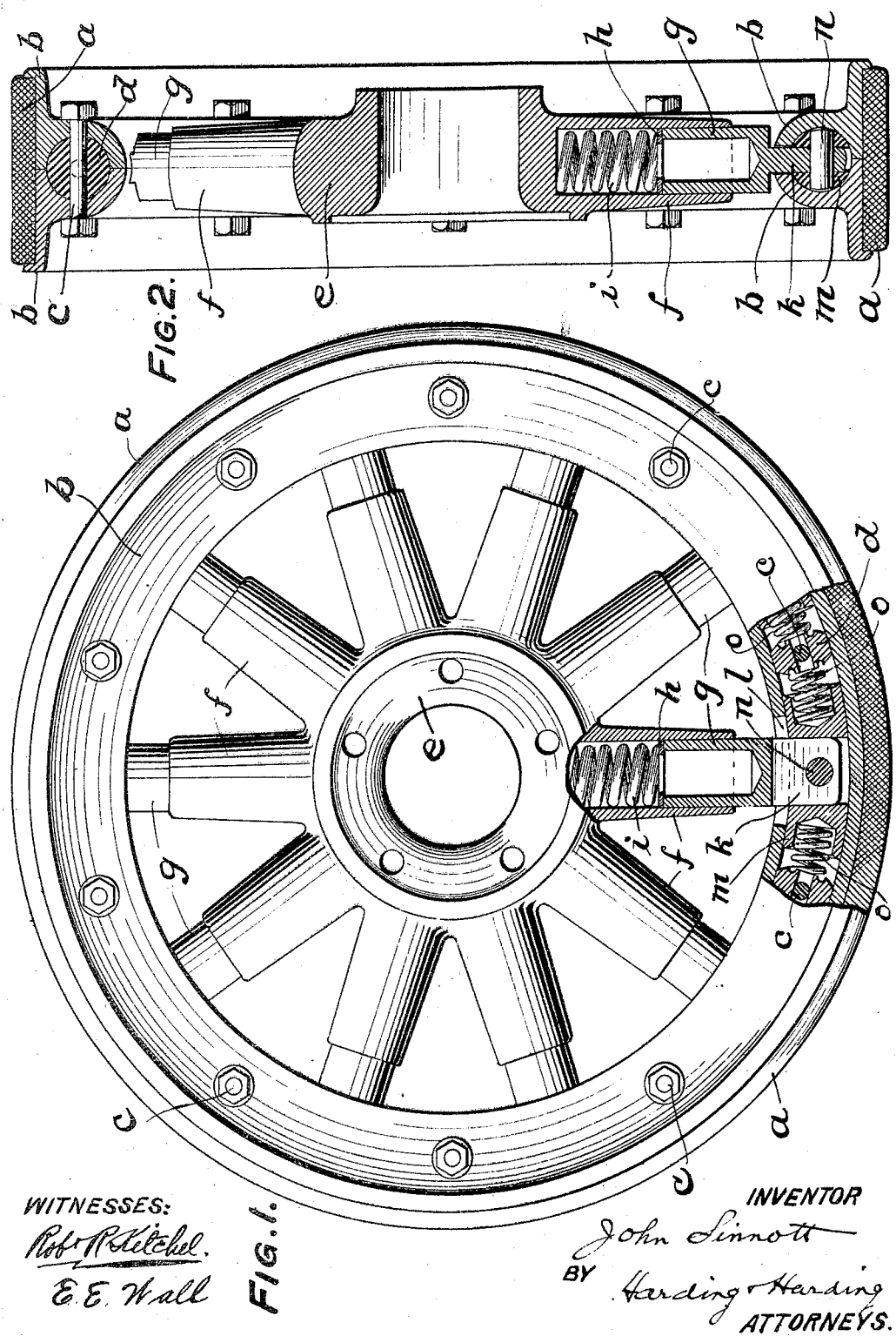

JOHN SINNOTT, OF PHILADELPHIA, PENNSYLVANIA.

VEHICLE-WHEEL.

1,032,435.

Specification of Letters Patent.   Patented July 16, 1912.

Application filed November 5, 1910. Serial No. 590,789.

*To all whom it may concern:*

Be it known that I, JOHN SINNOTT, a citizen of the United States, residing at Philadelphia, county of Philadelphia, and State of Pennsylvania, have invented a new and useful Improvement in Vehicle-Wheels, of which the following is a full, clear, and exact description, reference being had to the accompanying drawings, which form a part of this specification.

The object of the invention is to absorb shocks to the vehicle without the use of pneumatic or other similar tires.

More specifically, the object of the invention is to provide means to permit the rim to move circumferentially relatively to the spokes and radially relatively to the hub. This object is effected by means of the construction hereinafter claimed, one preferred embodiment of which is shown in the drawings, in which—

Figure 1 is a detailed side elevation, partly in section, of a part of my improved wheel; Fig. 2 is a sectional view taken longitudinally through a spoke and transversely through a movable shoe and the rim.

$a$ is the tire.

$b$ is the rim, made preferably in two sections, as shown in Fig. 2. The two halves of the rim are shown as secured together by the bolts $c$, which also extend through shoes or stops $d$, within the rim. These shoes, which are thus held within the rim, are located midway between the normal longitudinal center lines of the several spokes.

$e$ is the hub. Extending radially from the hub are inner spoke members $f$ each of which is tubular in form and telescopically engages an outer spoke member $g$. The outer spoke members are also tubular in form throughout most of that portion of their length that extends outside the rim. Overlying the inner open end of each outer spoke member $g$ is a washer $h$, and confined between the washer and the inner end of the corresponding inner spoke-member $f$ is a compression spring $i$. The outer reduced end $k$ of each outer spoke-member $g$ is solid and extends through a longitudinally extending slot $l$ formed in the inner wall of the rim $b$. This slot is of a length substantially exceeding the width of the outer end $k$ of the outer spoke-member.

$m$ is a shoe of circular cross-section having a loose sliding fit within the rim $b$. The central part of the shoe $m$ is cut away to form a slot for the reception of the reduced end $k$ of the outer spoke-member.

$n$ is a pivot pin extending through the reduced end $k$ of the outer spoke-member and the cut-away central section of the shoe $m$. Each outer end of the sliding shoe $m$ is centrally recessed to receive one end of a compression spring $o$, the other end of which abuts against an annular recess formed in the opposing face of the adjacent fixed shoe $d$.

In practice, the spokes of the wheel ride backward or forward with relation to the rim in a circumferential direction dependent upon the point of application of force upon the rim, the shoes $m$ each sliding within the rim in a longitudinal direction against the pressure of one or the other of the engaging springs $o$. At the same time, the part of the rim to which force is applied moves inwardly toward the hub by reason of the sliding connection between the spoke-members, this relative movement of spring and hub being against the pressure of the springs within the spokes. The pivotal connection between the outer spoke-members $g$ and the sliding shoes $m$ is of great value and importance, inasmuch as it permits the sliding shoes to have a slight degree of motion relative to the outer spoke-members sufficient to prevent binding of the shoes $m$ within the rim, which would otherwise occur.

Having now fully described my invention, what I claim and desire to protect by Letters Patent is:

1. A vehicle wheel comprising a hub, a rim, two sets of shoes respectively fixed and longitudinally movable within the rim, the shoes of one set being arranged alternately with respect to the shoes of the other set, springs between adjacent fixed and movable shoes, inner spoke members secured to the hub, and outer spoke members slidable relatively to the inner spoke members and pivotally connected with the movable shoes on an axis extending transversely of the rim.

2. A vehicle wheel comprising a rim, a hub, shoes movable longitudinally within the rim each having an orifice between its ends opening toward the hub, spokes radiating from the hub each having a reduced end extending through a slot in the inner wall of the rim and into the orifice in the corresponding shoe, pins each extending through the orificed part of one of the movable shoes and the reduced end of the corresponding spoke, other shoes held within the rim, and springs between adjacent shoes of the two sets of shoes.

3. A vehicle wheel comprising a hub, a rim, two sets of shoes respectively fixed and longitudinally movable within the rim, the shoes of one set being arranged alternately with respect to the shoes of the other set, springs between adjacent shoes of the two sets of shoes, inner spoke-members secured to the hub, outer spoke-members telescopically engaging the inner spoke-members, springs between the spoke-members, each outer spoke-member having a reduced end extending through a slot in the inner wall of the rim into a slot formed in and extending longitudinally of the corresponding movable shoe, and pins each extending through the orificed part of one of the movable shoes and the reduced end of the corresponding outer spoke-member.

4. A vehicle wheel comprising a rim of circular cross section, shoes of similar cross section slidable longitudinally in the rim, having a cut away part and end recesses, other shoes secured within the rim and having end recesses, coil springs between adjacent shoes of the two sets bottomed within said recesses, a hub, and spokes radiating therefrom, each spoke having a reduced outer end extending through a slot in the inner wall of the rim and engaging the cut-away part of the corresponding movable shoe.

In testimony of which invention, I have hereunto set my hand at Philada., Pa., on this 4th day of November, 1910.

JOHN SINNOTT.

Witnesses:
M. M. HAMILTON,
E. E. WALL.

---

Copies of this patent may be obtained for five cents each, by addressing the "Commissioner of Patents, Washington, D. C."